United States Patent [19]
Kleinberg

[11] Patent Number: 6,112,202
[45] Date of Patent: Aug. 29, 2000

[54] METHOD AND SYSTEM FOR IDENTIFYING AUTHORITATIVE INFORMATION RESOURCES IN AN ENVIRONMENT WITH CONTENT-BASED LINKS BETWEEN INFORMATION RESOURCES

[75] Inventor: Jon Michael Kleinberg, Los Gatos, Calif.

[73] Assignee: International Business Machines Corporation, Armonk, N.Y.

[21] Appl. No.: 08/813,749

[22] Filed: Mar. 7, 1997

[51] Int. Cl.$^7$ .................................................. G06F 17/30
[52] U.S. Cl. .................................. 707/5; 707/9; 707/101
[58] Field of Search .................................. 707/1, 2, 4, 5, 707/10, 100, 101, 102, 501

[56] References Cited

U.S. PATENT DOCUMENTS

| | | | |
|---|---|---|---|
| 5,257,185 | 10/1993 | Farley et al. | 707/100 |
| 5,446,891 | 8/1995 | Kaplan et al. | 707/2 |
| 5,778,363 | 7/1998 | Light | 707/5 |
| 5,826,031 | 10/1998 | Nielsen | 395/200.63 |
| 5,835,905 | 11/1998 | Pirolli et al. | 707/3 |

OTHER PUBLICATIONS

Savoy, J., Searching Information in Hypertext Systmes using Multiple Sources of Evidence, International Journal of Man–Machine Studies, 1993, pp. 1017–1030.

Stieger, H., Making Use of Hypertext Links when Retrieving Information, ACM, pp. 102–111, 1992.

R.W. Schwanke et al., Cross References are Features, Sec. 10.1, Book/Machine Learning: From Theory to Applications, Cooperative Research at Siemens and MIT, Appeared in Proceedings of the 2nd International Workshop on Software Configuration Mng., Princteon, NJ, Oct. 1989, ACM SIGSoft, IEEE CS, and GI pp. 107–123.

H.C. Arents et al., "Concept–Based Retrieval of Hypermedia Information: From Term Indexing to Semantic Hyperindexing," Information processing & Management vol. 29, No. 3, pp. 373–386, 1993.

R. Rada et al., "Retrieval Hierarchies in Hypertext," Information Processing & Mng., vol. 29, No. 3, (Printed in Great Britain) pp. 359–371, 1993.

W.M. Shaw, Jr., "Subject and Citation Indexing. Part 1: The Clustering Structure of Composite Representations in the Cystic Fibrosis Document Collection, " JASIS–Journal of the American Society for Information Science, vol. 42, No. 9, Oct. 1991, pp. 669–675.

W.M. Shaw, Jr., "Subject Indexing & Citation Indexing–Part II: A Evaluation and Comparison Information Processing & Management", vol. 26, No. 6, (printed in Great Britain) pp. 705–718, 1990.

T.R. Kochtanek, "Brief Communication, Document Clustering, Using Macro Retrieval Techniques, " Journal of the American Society for Information Science, vol. 34, No. 5, pp. 356–359, Sep. 1993.

F. Narin et al., Chapter 2., "Bibliometrics, " Pub. Annual Review of Information Science and Technology, pp. 35–58, 1977.

(List continued on next page.)

*Primary Examiner*—Thomas G. Black
*Assistant Examiner*—John Loomis
*Attorney, Agent, or Firm*—Khanh Q. Tran

[57] ABSTRACT

A system and method are provided for searching for desired items from a network of information resources. In particular, the system and method have advantageous applicability to searching for World Wide Web pages having desired content. An initial set of pages are selected, preferably by running a conventional keyword-based query, and then further selecting pages pointing to, or pointed to from, the pages found by the keyword-based query. Alternatively, the invention may be applied to a single page, where the initial set includes pages pointed to by the single page and pages which point to the single page. Then, iteratively, authoritativeness values are computed for the pages of the initial set, based on the number of links to and from the pages. One or more communities, or "neighborhoods", of related pages are defined based on the authoritativeness values thus produced. Such communities of pages are likely to be of particular interest and value to the user who is interested in the keyword-based query or the single page.

57 Claims, 5 Drawing Sheets

OTHER PUBLICATIONS

J. Bichteler et al, "Document Retrieval by Means of an Automatic Classification Algorithm for Citations, " Information Storage Retr. vol. 10, pp. 267–278, (Printed in Great Britain), 1974.

W.M. Shaw, Jr., "Subject and Citation Indexing Part II: Optimal, Cluster–Based Retrieval Performance of Composite Representations", Journal of the American Society for Information Science, vol. 42, No. 9, pp. 676–684, Oct. 1991.

M.E. Frisse, "Searching for Information in a Hypertext Medical Handbook, " Communications of the ACM, vol. 31, No. 7, pp. 880–886, Jul. 1988.

E. Rivlin., "Navigating in Hyperspace: Designing a Structure–Based Toolbox, " Navigating in Hyperspace, Comm. of ACM, vol. 37, No. 2, pp. 87–96, Feb. 1994.

R. Weiss et al., HyPursuit: A Hierarchical Network Search Engine that Exploits Content–Link Hypertext Clustering, Programming Systems Research Group, MIT Lab. For Computer Sci., 545 Technology Square, Cambridge, MA 02139, no date.

D.A. Speilman et al., Spectral Partitioning Works: Planar graphs and finite element meshes., Abstract based on UC Berkeley Tech. Report, UCB/CSD–96–898, no date.

G. H. Golub, (book) Matrix Computations, 2nd Edit., Ch. 5, Orthogonalization & Least Squares, 5.2.7 Classical Gram–Schmidt, pp. 218–219; Ch. 7 The Unsymmetric Eigenvalue Problem, 7.3 Power Iterations, pp. 351–354, Orig. Pub. 1989.

METHOD AND SYSTEM FOR IDENTIFYING AUTHORITATIVE INFORMATION RESOURCES IN AN ENVIRONMENT WITH CONTENT-BASED LINKS BETWEEN INFORMATION RESOURCES

FIELD OF THE INVENTION

The invention generally relates to the field of Information networks, communication, and information storage and retrieval. More specifically, the invention relates to the task of searching for items, among a networked collection of information resources, the items satisfying a desired criterion. The invention has particular applicability to hypertext/hyperlinked environments such as the World Wide Web.

GLOSSARY OF TERMS USED

While dictionary meanings are also implied by certain terms used here, the following glossary of some terms may be useful.

Graphical User Interface (GUI): A computer user interface characterized by the visual "desktop" paradigm, having images, windows, icons, and graphical menus representative of data objects, functions, or application programs, and utilizing a cursor, movable by a user input device such as a mouse, for selecting and manipulating the icons, etc., by clicking on mouse input buttons; as distinct from a character- or text-oriented user interface.

Internet ("the Net"): A connection system that links computers worldwide in a network.

TCP/IP: Transmission Control Protocol/Internet Protocol. A packet switching scheme the Internet uses to chop, route, and reconstruct the data it handles, from e-mail to video.

World Wide Web (WWW, "the Web"): The Internet's multimedia application that lets people seeking information on the Internet switch from server to server and database to database by clicking on highlighted words or phrases of interest. An Internet Web server supports clients and provides information.

Home page: A multimedia table of contents that guides a Web user to stored information on the Internet.

Server: A machine (computer) which performs a task at the command of another machine ("client"). In the context of the present invention, a server's primary function is to facilitate distribution of stored information over the Web.

Client: A machine which provides commands to a server, and is serviced by the server. Typically, a client machine is operated by an end user, and functions responsive to user commands.

Web Browser: A program running on a user-operated client computer. When a user "surfs" the Web using a browser, the browser acts as an Internet tour guide, allowing the client machine to display pictorial desktops, directories and search tools supported by the server.

URL: Universal Resource Locator, a Web document version of an e-mail address, in character string form, which uniquely identifies a document, application, or tool available over the Web.

Hyperlink: A network addressing tool embedded in a user-understandable displayed and/or highlighted item, such as a word, phrase, icon or picture. A URL can be accessed by means of its corresponding Hyperlink. When a user on a client machine selects the highlighted hyperlink through the user interface, the underlying item is then retrieved to the client supporting a Web browser.

HTTP Hypertext transfer protocol: Hypertext transfer protocol. The character string "http:" at the beginning of a URL indicates that the document or file designated by the URL contains hyperlinks defined according to the HTTP.

HyperText Markup Language (HTML): HTML is the language used by Web servers to create and connect documents that are viewed by Web clients. HTML uses Hypertext documents. Other uses of Hypertext documents are described in the following U.S. patents:

Bernstein et al., U.S. Pat. No. 5,204,947, issued Apr. 20, 1993;

Bernstein et al., U.S. Pat. No. 5,297,249, issued Mar. 22, 1994; and

Lewis, U.S. Pat. No. 5,355,472, issued Oct. 11, 1994;

all of which are assigned to International Business Machines Corporation, and which are referenced herein.

BACKGROUND OF THE INVENTION

In recent years, the technology of multimedia storage and interactive accessing has converged with that of network communications technologies, to present exciting prospects for users who seek access to remotely stored multimedia information. Particularly exciting has been the recent prominence of the Internet and its progeny, the World Wide Web. The Internet and the Web have captured the public imagination as the so-called "information superhighway." Accessing information through the Web has become known by the metaphorical term "surfing the Web."

The Internet is not a single network, nor does it have any single owner or controller. Rather, the Internet is an unruly network of networks, a confederation of many different networks, public and private, big and small, whose human operators have agreed to connect to one another.

The composite network represented by these networks relies on no single transmission medium. Bi-directional communication can occur via satellite links, fiber-optic trunk lines, phone lines, cable TV wires, and local radio links. However, no other communication medium is quite as ubiquitous or easy to access as the telephone network. The number of Web users has exploded, largely due to the convenience of accessing the Internet by coupling home computers, through modems, to the telephone network. As a consequence, many aspects of the Internet and the Web, such as network communication architectures and protocols, have evolved based around the premise that the communication medium may be one of limited bandwidth, such as the telephone network.

To this point the Web has been used in industry predominately as a means of communication, advertisement, and placement of orders. The Web facilitates user access to information resources by letting the user jump from one Web page, or from one server, to another, simply by selecting a highlighted word, picture or icon (a program object representation) about which the user wants more information. The programming construct which makes this maneuver possible is known as a "hyperlink".

In order to explore the Web today, the user loads a special navigation program, called a "Web browser" onto his computer. A browser is a program which is particularly tailored for facilitating user requests for Web pages by implementing hyperlinks in a graphical environment. If a word or phrase, appearing on a Web page, is configured as an hyperlink to another Web page, the word or phrase is typically given in a color which contrasts with the surrounding text or background, underlined, or otherwise highlighted. Accordingly, the word or phrase defines a region, on the graphical representation of the Web page, inside of which a mouse click will activate the hyperlink, request a download of the linked-to page, and display the page when it is downloaded.

There are a number of browsers presently in existence and in use. Common examples are the NetScape, Microsoft, Mosaic, and IBM's Web Explorer browsers. Browsers allow a user of a client to access servers located throughout the world for information which is stored therein. The information is then provided to the client by the server by sending files or data packets to the requesting client from the server's storage resources.

Part of the functionality of a browser is to provide image or video data. Web still image or video information can be provided, through a suitably designed Web page or interface, to a user on a client machine. Still images can also be used as Hypertext-type links, selectable by the user, for invoking other functions. For instance, a user may run a video clip by selecting a still image.

A user of a Web browser who is researching a particular area of interest will often want to make a content-based search, over as many Web pages as practicable, to identify Web pages whose content relates to the area of interest. To meet this need, search engines have been developed, which execute keyword-based searches to find Web pages whose content satisfies logical constraints given in terms of the keywords. Examples are Yahoo and AltaVista.

To be effective, a search engine must effectively identify content, capturing relevant pages and discarding irrelevant pages. This effectiveness relies partly on the user's skill at crafting a keyword search command, and partly on the search engine's ability to avoid false hits and false misses. The latter factor is a function of the design of the search engine.

Thus, an important design objective in an Internet/Web search engine is to facilitate the user's desire to find Web pages whose content matches what he/she desires. There is a significant need for systems and techniques which facilitate higher quality search results.

A number of current methods provide mechanisms for searching in such an environment. Most current methods in use perform searching by computing some type of similarity measure between the terms appearing in the user's query string and the words appearing in the set of pages. The pages that score highest under this similarity measure are then deemed to be the most relevant.

In a hyper-text environment that is sufficiently large and unstructured, this approach has the following limitation. For queries that are sufficiently "general" in nature, a search based on term-matching can easily return several thousand pages that are highly "relevant" to the query, in the sense that they score highly under the term-based similarity measure. This results in a volume of output much greater than a human user can digest.

There is a need, therefore, for techniques which allow a user to find, from among a large set of pages which are relevant in the sense of term matching, those fewer pages which can be of particular help to the user in his/her quest for desired information.

Some conventional techniques have made use of pointers (e.g., hyperlinks) to and from an initial set of information items. See Kochtanek, "Document Clustering, Using Macro Retrieval Techniques," Journal of the American Society for Information Science, vol. 34, no. 5, September 1983, pp. 356–359. However, there remains a need for further, more sophisticated techniques that produce better quality information for the user.

SUMMARY OF THE INVENTION

It is therefore an object of the invention to provide a new strategy and technique for obtaining desired information in a hyperlink environment.

It is a further object of the invention to find, from among a collection of information resources such as Web pages, where content-based links (e.g., hyperlinks) exist between different information resources, a set of information resources which satisfy a desired criterion.

It is a further object of the invention to find, from among a collection of information resources such as Web pages, where content-based links (e.g., hyperlinks) exist between different information resources, a set of information resources which are, in a sense, "authoritative" as to a particular subject.

It is a further object of the invention to find, from among a collection of information resources such as Web pages, where content-based links (e.g., hyperlinks) exist between different information resources, a set of information resources which are, in a sense, "authoritative" as to a particular subject, responsive to a query directed to that subject.

To achieve these and other objects, the present invention is directed to a method and system for automatically identifying the most authoritative pages from among a large set of hyperlinked pages. (Note that the term "page" will be used for the sake of brevity, without limiting or detracting from the meaning denoted or implied by the broader term "information resources.") A user may use the invention if he/she has a page, whose content is of interest, and desires to find other pages which are authoritative as to that content of interest.

Alternatively, the user might begin with a query, such as a keyword-based search strategy in a Web search engine, and retrieve a set of pages that satisfy that query. The invention is then utilized to find a set of pages which are authoritative as to the subject matter in the pages located. This set of pages produced by the invention may include a subset of the retrieved pages, as well as pages not retrieved but which are linked to pages that were retrieved.

The method of the invention includes the following steps:

First, an initial set of pages is obtained. The method may begin with a single page, where the content of that page is of interest, or with a group of pages, for instance produced as a result of a keyword-based query by a Web search engine. Because of the content-based links (e.g., hyperlinks) between the pages, there will be a certain number of additional pages linked to or from the single page, or group of pages. The initial set, then, includes the single page or group of pages, plus the linked pages.

Then, authoritativeness information is obtained for the pages of the initial set. The authoritativeness information exists on a per page basis, and is related to the number of links to or from the page. At first, the links are simply counted. In a preferred class of embodiments, however, a sequence of iterations are performed, in which the authoritativeness information, in the form of scores such as numerical scores, is produced, for each given page in each successive iteration, by summing the scores, from the previous iteration, of pages linked to or from the given page. Preferably, the scores are normalized after each iteration. It can be proven that the scores obtained in this fashion will converge.

Finally, "neighborhoods" or "communities" of pages are obtained from the resultant authoritativeness information. A single neighborhood may be obtained, or several distinct neighborhoods may be obtained by partitioning the scores into ranges.

The basic concept of the invention has applicability in numerous areas. For instance, in a population of computer network users, links may take the form of E-mail messages from one user to another. The invention may be practiced to define communities of users, within the population, which communicate with each other a lot, or to identify individual users, which are authoritative sources of information, based on the number of E-mail messages they receive, and from whom they are received.

Another area in which the invention may be applied is the area of telephone call records. As above, certain telephone subscribers may be considered authoritative by virtue of receiving a large number of calls from a distinct segment of the telephone subscriber population. These population segments, and the authoritative subscribers, may be identified through use of the invention.

However, it is believed that the invention has particular applicability to the World Wide Web. A user, having interest in a particular area of subject matter and seeking Web pages related to that subject matter, may advantageously use the invention to locate authoritative pages on that subject matter.

While the invention is primarily disclosed as a method, it will be understood by a person of ordinary skill in the art that an apparatus, such as a conventional data processor, including a CPU, memory, I/O, program storage, a connecting bus, and other appropriate components, could be programmed or otherwise designed to facilitate the practice of the method of the invention. Such a processor would include appropriate program means for executing the method of the invention.

Also, an article of manufacture, such as a pre-recorded disk or other similar computer program product, for use with a data processing system, could include a storage medium and program means recorded thereon for directing the data processing system to facilitate the practice of the method of the invention. It will be understood that such apparatus and articles of manufacture also fall within the spirit and scope of the invention.

DESCRIPTION OF THE PREFERRED EMBODIMENT

GENERAL DISCUSSION OF "AUTHORITATIVENESS"

In accordance with the invention, a searching method, or a search engine, goes beyond the notion of "relevance," judged in terms of satisfaction of a keyword search strategy, to the notion of "authoritativeness."

As with the notion of relevance, the evaluation of authoritativeness necessarily depends on human judgment. In other words, the notion of authoritativeness may be subjective, or may depend on a variety of factors.

However, in a large hyper-media environment, it is possible to judge authoritativeness by making use of the judgment of users who have already created links in the environment. Thus it is our thesis here that, to a large extent, the authority, or authoritativeness, of a page can be determined by making use of the existing link structure of the environment. Because the existing link structure is objectively observable, it is possible to automate the evaluation of authoritativeness.

The method of the invention, in its preferred embodiments to be described below, is predicated on the notion that, in a hyper-media environment such as the World Wide Web, there are in fact two distinct types of authoritative pages that are of value to a user. Heretofore the terms "authority," "authoritative," etc., have been used generically. In the discussion which follows, the terms will be used more specifically to denote one of the two distinct types. (Overall, it is hoped that the context of a given portion of the discussion will make clear whether the term is being used in the generic sense, or in the narrower sense.)

First, there are pages that will be termed "authorities." Authority pages correspond intuitively to "definitive references" on the query topic, and receive a large amount of user traffic. In hyperlinked environments, an authority is preferably a page to which there are links in a large number of other pages on related subject matter. An authority pages is regarded as authoritative as to a topic in the sense that it is the destination of a large number of links related to that subject matter.

Second, there are pages that will be termed "hubs." A hub is a page containing a large number of links to other pages. Hub pages correspond intuitively to the "hot-lists," bookmark collections, and other compendia of resources that have been compiled by individual creators of pages. A hub page is regarded as authoritative in the sense that a large number of other related pages can be found by following its links.

Authorities and hubs have what could be termed a self-reinforcing relationship. That is, if H is a set of pages that are potential hubs, then the pages that they point to the most become candidate authorities. Conversely, if A is a set of pages that are potential authorities, then the set of pages that point to them the most become candidate hubs.

The method of the invention makes use of this relationship between hubs and authorities. Preferred embodiments of the invention are implemented as a method which iteratively follows links backward to hubs and forward to authorities, keeping authoritativeness information, preferably in the form of scores which reflect the number of links.

It is possible to obtain useful results by running only a single iteration. In that case, it is not really meaningful to call the single execution an "iteration." Rather, the method simple executes a sequence of steps once, and then is finished.

Successive iterations, however, cause the scores for the various pages to converge to a set of authorities and hubs, including a neighborhood having maximal scores. It can be proved that, upon successive iterations, the scores converge to final values, and that the resulting equilibrium state satisfies a precise version of the above self-reinforcing property of authorities and hubs. See F. Narin et al., "Bibliometrics," Annual review of Information Science and Technology, White Plains, N.Y.: Knowledge Industry Publications, Inc., 1977, pp. 35–58.

Note, by the way, that depending on the particular way in which scores are computed, they can have positive or negative values. The signs of the scores have no inherent meaning, and are significant only to the extent that they identify distinct neighborhoods.

The method can be directly extended to produce several, relatively disjoint, communities of authorities and hubs. The method of the invention, when practiced in such a fashion, serves a clustering function. That is, the more disjoint these communities are, the more they are capable of corresponding to intuitive partitions of the query topic. The partitions may be made according to various criteria, including both semantic distinctions and social "clustering" among creators of hyper-links.

FIRST EMBODIMENT—A SINGLE NEIGHBORHOOD

Preferred embodiments of the iterative algorithm of the invention will now be described in more detail. The discussion of the first preferred embodiment will make use of FIGS. 1–5.

Figure 1:
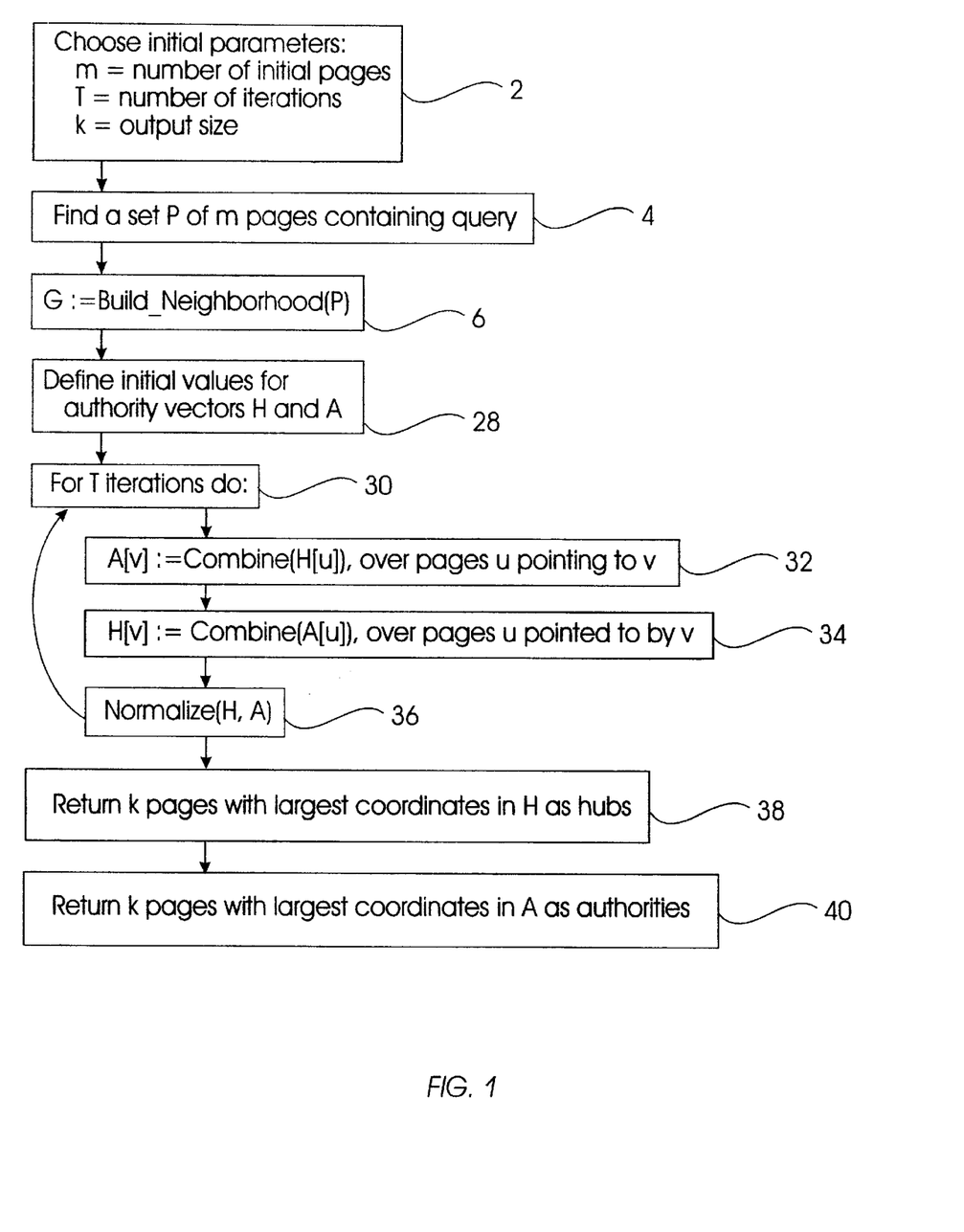
FIG. 1 is a flowchart illustrating a first preferred embodiment of the method of the invention.

FIG. 1 depicts the basic iterative algorithm of the invention. Initially, a set of query parameters may be chosen, as suitable for the particular situation. For instance, as per step 2, a number m of initial pages, a number T of iterations, and an output size k may be designated.

One mode of operation for the algorithm is for a user to have in mind a search strategy, such as a logical combination of keywords, defining the desired subject matter. The basic concepts of defining keyword search strategies are well known, and will not be elaborated upon here.

Alternately, the user may make use of any other method for generating an initial set of hyper-linked pages. For instance, if the user knows of one page with subject matter of interest, and seeks to find authoritative pages as to that subject matter, the initial set may be obtained merely by finding other pages linked to or from that page.

In any event, the result will be an initial set P of pages.

Referring to FIG. 1, the initial set P of pages containing the query string is computed, as above (step 4). Any suitable method of identifying the set P may be used. A preferred method is via a standard term-matching algorithm. The set P may be specified as to size, through the use of a selected parameter m, as discussed in connection with step 2.

In accordance with the invention, the hyperlinks between different pages are used to determine the authoritativeness of pages which have been found. If a given search strategy finds a number of related pages, many of them are likely to have hyperlinks in common, either between each other or to/from other pages in common. If the search also captures a "false hit" of unrelated subject matter, that unrelated page will lack such hyperlinks in common. The invention takes advantage of this fact to establish the authoritativeness of a set of pages.

Preferably, the initial set P is used to establish a "neighborhood" of common or interconnecting hyperlinks (step 6).

Figure 2:
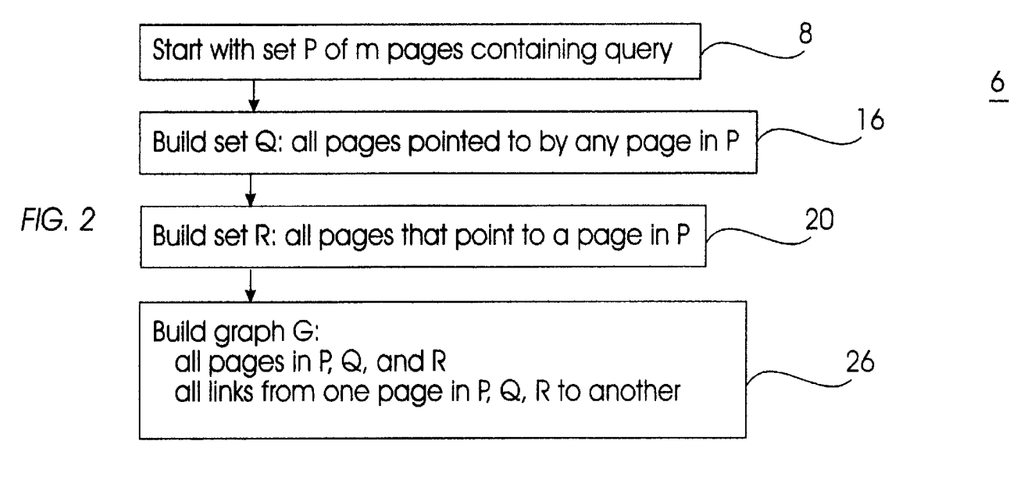
FIG. 2 is a flowchart showing, in more detail, a portion of the flowchart of FIG. 1.
Figure 3:
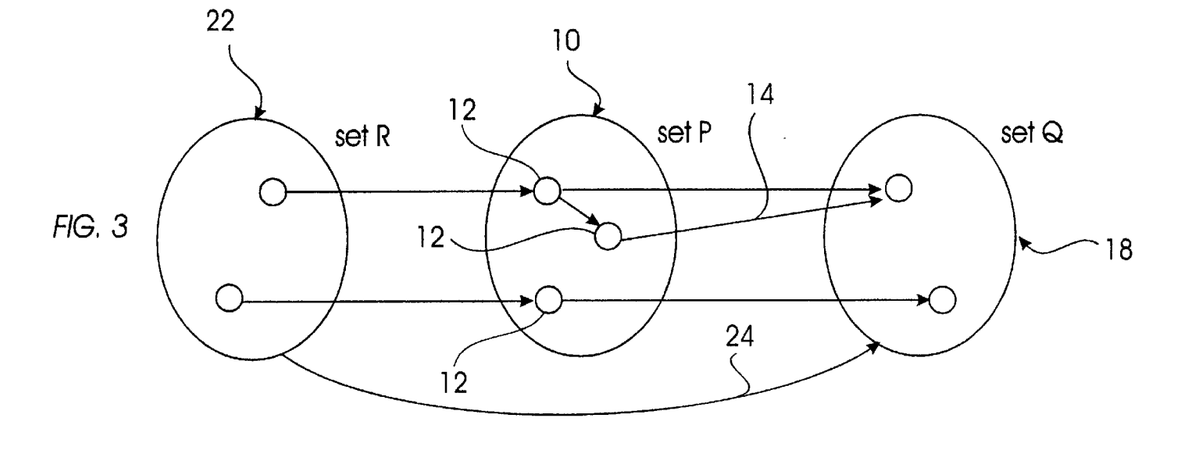
FIG. 3 is a schematic diagram of sets of pages for illustration of the steps executed by FIG. 2.

In a preferred embodiment, the method (step 6) for constructing the neighborhood of the set P of pages is depicted in FIG. 2. The neighborhood itself is shown schematically in FIG. 3. FIGS. 2 and 3 will now be discussed, and afterward, the discussion of FIG. 1 will resume.

Step 8 of FIG. 2 states that we begin with the set P of pages produced by step 4. That set is shown collectively as 10 in FIG. 3. Individual pages 12 are shown schematically as small circles. Hyperlinks 14 are shown as arrows. A hyperlink 14 is in a page 12 if the tail end of the arrow touches that page, and the hyperlink 14 points to another page 12 touched by the head of the arrow.

In step 16, a set Q (shown as 18 in FIG. 3) is obtained, consisting of all pages 12 which are pointed to by the pages 12 in the set P 10. The set Q 18 is an initial set of pages which will be referred to as "authorities," meaning that a large number of other pages have links to the authority pages.

In step 20, a set R (shown as 22 in FIG. 3) is obtained, consisting of all pages 12 which point to the pages 12 in the set P 10. The set R 22 is an initial set of pages which will be referred to as "hubs," meaning that they contain a large number of links to authoritative pages.

When such sets are constructed, since most of the pages 12 making up the sets will likely relate to the desired subject matter, it will also likely be the case that pages in the sets Q 18 and R 22 will have links to each other. One such link 24 is shown, between pages 12 in the sets Q 18 and R 22. This exemplary link further illustrates the concept that a "hub" page (the page 12 in the set R 22 which is the source of the link 24) has a link to an "authority" page (the page 12 in the set Q 18 which is the destination of the link 24).

Therefore, the neighborhood consists of all pages that either point to a page in the set P 10, or are pointed to by a page in the set P 10. In other words, the neighborhood includes the initial set of pages, an initial set of hub pages, and an initial set of authority pages. The neighborhood is defined in software, in a suitable manner for further processing, preferably using conventional database techniques such as graphing or metadata (step 26). To limit the size of the neighborhood, one can optionally impose an upper bound on the allowed number of pages pointing to any single page in P.

Optionally, a graph such as that shown in FIG. 3 may be constructed for display, to allow the user to see the state of the query.

Returning to FIG. 1, an iterative process is set up for refining the sets of hub and authority pages by alternately finding other pages that the pages of the neighborhood are linked to, and finding other pages that are linked to the pages of the neighborhood. The next several steps of FIG. 1 illustrate a preferred way of doing so.

In step 28, hub and authority vectors H and A are defined, where each term of each of the vectors corresponds with one of the pages in the neighborhood. The iterative algorithm is to operate on these vectors.

In the preferred embodiment, the initial values of H and A are computed as follows, where u and v are pages in the neighborhood:

The vector H is initialized as follows:

$H[v]=1$ if v belongs to P $H[v]=0$ if v does not belong to P $A[v]=0$ for all pages v The entries in these two vectors are now updated iteratively (step 30). One preferred method for performing this updating is given in flowchart form in the next several steps of FIG. 1, and depicted graphically in FIGS. 4 and 5.

Figure 4:
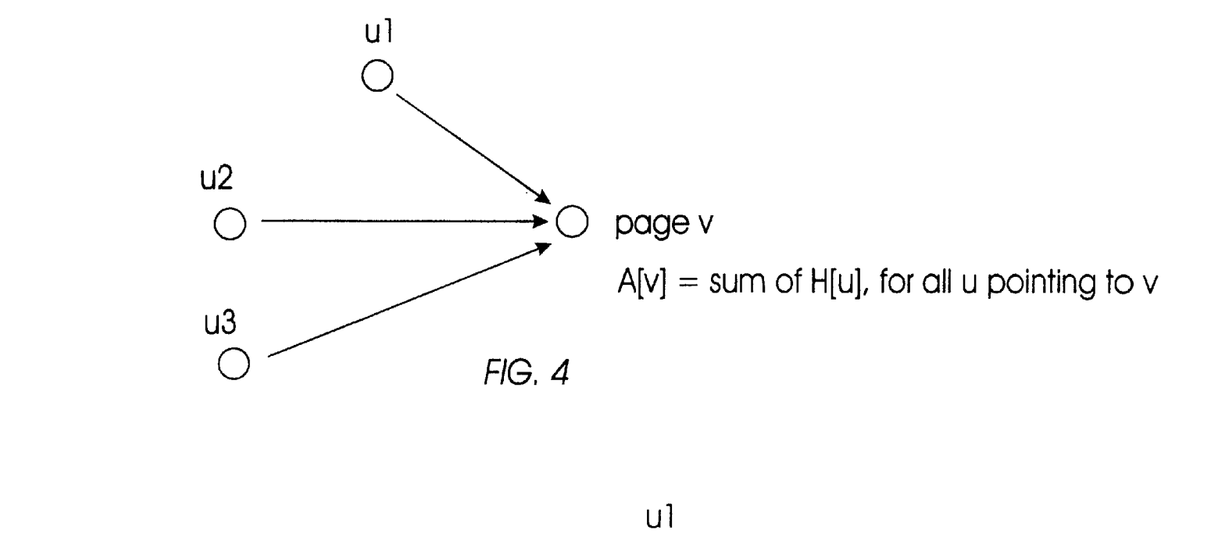
FIGS. 4 and 5 are schematic diagrams illustrating steps of the flowchart of FIG. 1.

If u and v are pages, let u→v denote the presence of a link from u to v. Then the values of the terms of the hub and authority vectors H and A are updated as follows:

These two equations are shown respectively as steps 32 and 34 in FIG. 1. Equation (1) is illustrated in FIG. 4, in which three pages u1, u2, and u3 have links to a page v. The authority vector's term $A[v]$ for the page v is the sum of the hub vector values $H[u1]$, $H[u2]$, and $H[u3]$ for the three pages u1, u2, and u3.

Figure 5:
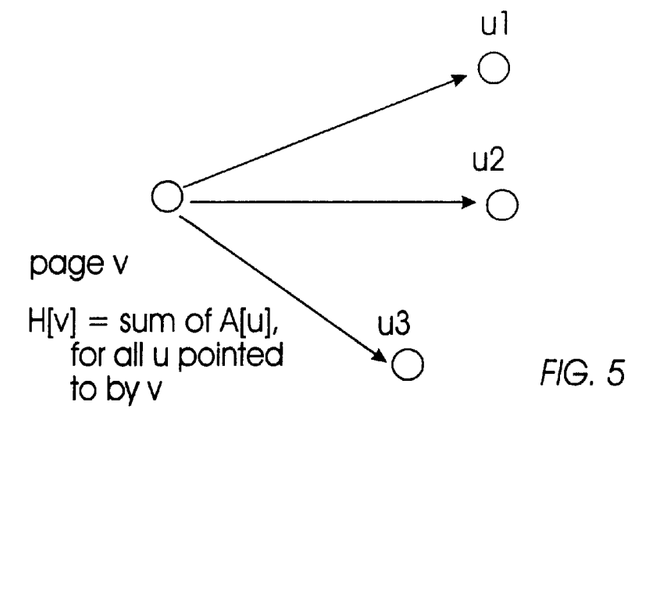

Similarly, Equation (2) is illustrated in FIG. 5, in which a page v has links to $$H[v] \leftarrow \sum_{u \to v} A[u] \qquad (1)$$

$$A[v] \leftarrow \sum_{u \to v} H[u] \qquad (2)$$

three pages u1, u2, and u3. The hub vector's term H[v] for the page v is the sum of the authority vector values A[u1], A[u2], and A[u3] for the three pages u1, u2, and u3.

It will be seen that, as these iterations are performed, the values of the terms of the hub and authority vectors will increase. Accordingly, the vectors are preferably normalized, to prevent the numerical values from growing too large (step 36). One preferred normalization method is the following:

$$A[v] \leftarrow \frac{A[v]}{\sum_u A[u]^2} \qquad (3)$$

$$H[v] \leftarrow \frac{H[v]}{\sum_u H[u]^2} \qquad (4)$$

Following the normalization of step 36, the iteration is complete. Further iterations may follow as appropriate, such as by looping back T times, where T is the number of iterations specified in step 2.

It will be seen that, as the successive iterations proceed, the hub and authority vector values will increase based on the number of links common to the page populations. The pages unrelated to the desired subject matter, which will have relatively few links to the pages related to the desired subject matter, will have relatively low values, and will, in effect, be "weeded out."

When the iterations have been completed, FIG. 1 concludes by outputting its final results. A preferred output technique, given in steps 38 and 40, is to scan the hub and authority vectors H and A, to find the k largest terms, k having been specified in step 2, and being presumptively smaller than the number of pages identified.

Note that steps 28–36 may be executed only a single time, and still obtain useful results. Depending on the particular situation in which the invention is to be practiced, a user may choose to run only a single iteration and accept the results as satisfactory, to run a relatively small number of iterations, such as a fixed number or a number required to reach some extrinsic limit such as a limit imposed by cost or other factors, or to run until convergence of the results is detected.

SECOND EMBODIMENT—SEVERAL NEIGHBORHOODS

The above-described method may be extended to locate several communities of authorities and hubs. Iterations are performed in essentially the same manner as described above, but now, several vectors of each type are maintained. For instance, if there are to be q hub vectors and q authority vectors, representing q number of distinct neighborhoods, then the hub and authority vectors are shown as distinguished by index subscripts, as follows: $A_0, \ldots, A_q$ and $H_0, \ldots, H_q$.

Figure 6:
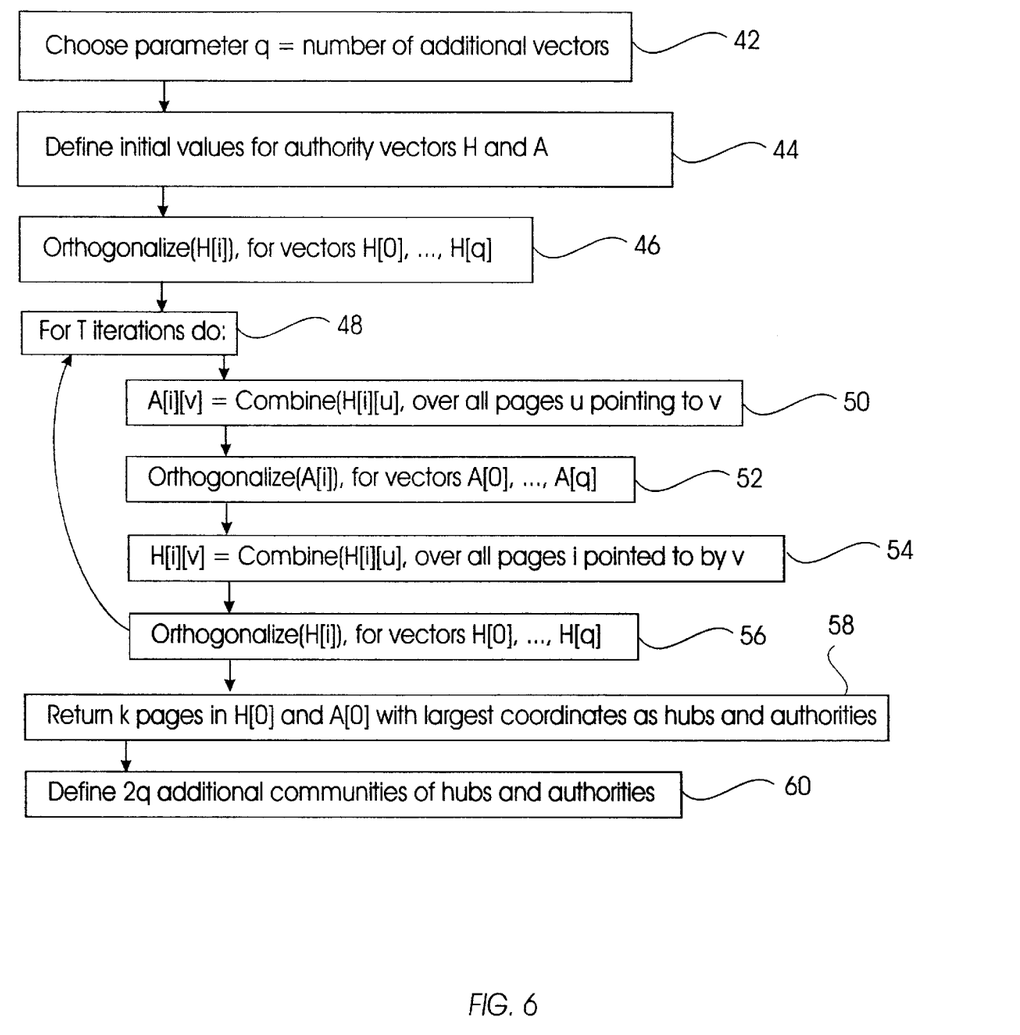
FIG. 6 is a flowchart illustrating a second preferred embodiment of the method of the invention.

FIG. 6 is a flowchart, comparable to that of FIG. 1, showing a preferred embodiment of the invention where a plurality of neighborhoods are to be found. Certain steps which were shown in FIG. 1 have been omitted from FIG. 6 for the sake of brevity. It will be understood, however, that these omitted steps are to be included, as appropriate.

Initially, the implementation of FIG. 6 chooses the additional input parameter q, a number of neighborhoods (i.e., of hub and authority vectors) to be found (step 42). In step 44, initial values for the terms of the hub and authority vectors are set.

However, the initialization is preferably performed in a different manner from what was done in step 28 of FIG. 1. The objective of this embodiment is to come up with distinct neighborhoods. Consequently, it is necessary that the final result of the iterations be multiple distinct vectors. In order for the iterations to converge to multiple distinct vectors, it is necessary that no two of the vectors become equal during the course of the iterations.

For this purpose, the vectors are initialized so as to be orthogonal. Moreover, following each iteration, they are again updated so as to remain orthogonal. This updating step can be accomplished by the standard Gram-Schmidt procedure, as given in G. Golub, C.F. Van Loan, "Matrix Computations", Johns Hopkins University Press, 1989.

In light of the foregoing, the preferred embodiment of the invention is as follows: Before the iterations begin, in step 46 the hub vectors are orthogonalized. The initial orthogonalization may conveniently be performed by assigning each coordinate a real-number value chosen uniformly at random from the interval [0,1].

The iterations are now performed (step 48). For a given iteration, the summing, similar to those given above in Equations (1) and (2), is done separately over each pair of hub and authority vectors $(A_i, H_i)$.

At the end of each iteration, the vectors are modified to be mutually orthogonal. This can be accomplished by the standard Gram-Schmidt procedure given in G. Golub (supra).

A preferred sequence of the steps of an iteration are given in FIG. 6, as follows: In step 50, the authority vectors are updated. When they are all updated, they are then orthogonalized (step 52). Then, in step 54, the hub vectors are updated. When they are all updated, they are then orthogonalized (step 56). This completes an iteration. The iteration is repeated a desired number of times.

As with the embodiment of FIG. 1, the largest (positive) entries of $A_0$ and $H_0$ are returned as the primary hubs and authorities. One can then define 2q additional authority/hub communities, by taking the q most positive and the q most negative entries from each of the pairs of vectors $(A_i, H_i)$, for i=1, . . . , q.

Note that the Gram-Schmidt procedure, which includes subtractions, can produce negative values for vector terms. The positivity or negativity of the entries does not have a direct meaning in the context of the method. Rather, a more significant meaning is attributed to the magnitudes, i.e., absolute values, of the terms. In general, the more links to or from a page, or, more broadly, the greater the authoritativeness of the page as to the desired subject matter, the greater the magnitude of the value will be.

The noteworthy property of the entries, taken as a group, is simply that they may be partitioned into two or more communities, based on their ranges of values. It may be convenient or desirable, where one set is positive and the other set is negative, to partition at the zero value. However, it is not crucial that the partitions be evenly distributed or symmetric. More generally, any subset of the communities can be returned, possibly according to additional criteria imposed by the user on the set of pages.

For discussion purposes, however, an example will be given in which partitioning is to be symmetric about the zero point.

Figure 7:
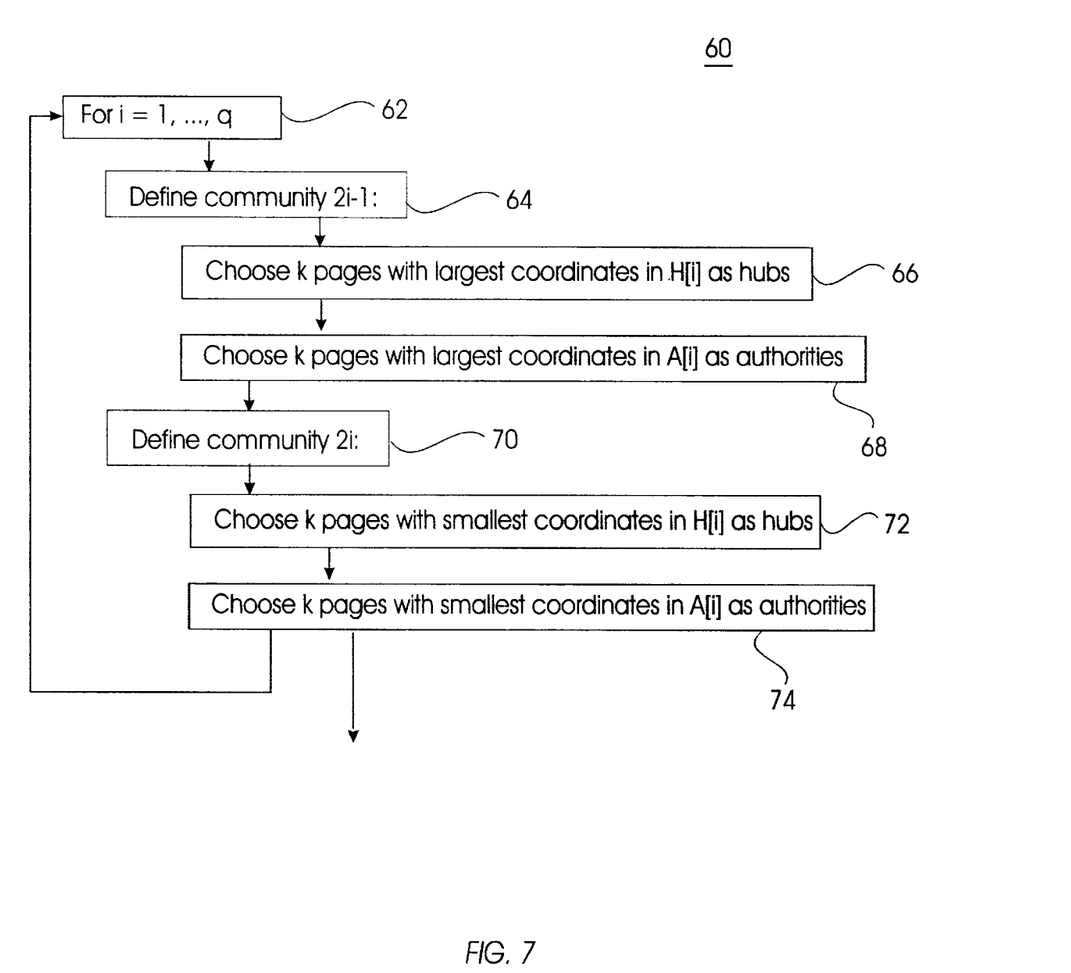
FIG. 7 is a flowchart showing, in more detail, a portion of the flowchart of FIG. 6.

FIG. 7 gives a more detailed description of a preferred implementation of step 60 of FIG. 6, subject to the constraint of symmetry, just given. Where $2q$ communities are to be identified, the method of the invention may conveniently be implemented to follow the symmetry.

The definition of the 2q communities proceeds as a series of q iterations of a sequence of steps, where each iteration produces two communities, one for pages with large coordinates and one for pages with small coordinates. Here, "smallest" is taken to mean most negative, i.e., having the largest negative magnitude.

The iteration is expressed, in step 62, as a FOR loop to be executed q number of times.

In step 64, a community, indexed as community $2i-1$ (for $1<i<q$), is defined, by choosing k pages with largest coordinates in the vector H[i] as hubs (step 66), and choosing k pages with largest coordinates in the vector H[i] as hubs (step 66).

Next, in step 70, a community, indexed as community $2i$ (for $1<i<q$), is defined, by choosing k pages with smallest coordinates in the vector H[i] as hubs (step 66), and choosing k pages with smallest coordinates in the vector H[i] as hubs (step 66).

This completes an iteration. In successive iterations, the pages with progressively smaller coordinates are used to define the hubs and authorities for odd-indexed communities, and the pages with progressively larger coordinates are used to define the hubs and authorities for even-indexed communities, until all $2q$ of the communities have been defined.

MATHEMATICAL INTERPRETATION

The discussion which follows will present a somewhat more theoretical treatment of the concepts relating to hubs and authorities, which have been discussed above. Certain aspects of the discussion may be foreseen from the existing literature.

The hub and authority vectors H and A correspond to the principal eigenvectors of two matrices associated with the set of pages.

Let M denote the matrix whose (i,j) entry gives the number of pages that point to both page i and page j. Let N denote the matrix whose (i,j) entry gives the number of pages that are pointed to by both page i and page j.

Then the above iterative procedures are in fact an implementation of the power iteration method, given in G. Golub, C. F. Van Loan, "Matrix Computations", Johns Hopkins University Press, 1989, p. 351, for computing the principal eigenvectors of the matrices M and N.

In particular, the authority vector A is the principal eigenvector of M, and the hub vector H is the principal eigenvector of N.

The additional vectors $A_i$ and $H_i$ correspond to non-principal eigenvectors of M and N respectively. The use of such eigenvectors for clustering is known as spectral partitioning, and has been studied as a graph algorithm. See, for instance, D. Spielman, S. Teng, "Spectral partitioning works: Planar graphs and finite-element meshes," Proceedings of the 37th IEEE Symposium on Foundations of Computer Science, 1996.

The entries of the matrices M and N correspond to co-citation and bibliographic coupling, which have been studied in the bibliometric literature.

Since the algorithm works on an arbitrary set of linked pages, it is worth noting that it can be run in a query-independent fashion. In particular, given a set of pages, the identification of hubs and authorities among them gives a method for automatically determining the topic that best "fits" the set of pages.

SUMMARY

Using the foregoing specification, the invention may be implemented using standard programming and/or engineering techniques using computer programming software, firmware, hardware or any combination or subcombination thereof. Any such resulting program(s), having computer readable program code means, may be embodied or provided within one or more computer readable or usable media such as fixed (hard) drives, disk, diskettes, optical disks, magnetic tape, semiconductor memories such as read-only memory (ROM), etc., or any transmitting/receiving medium such as the Internet or other communication network or link, thereby making a computer program product, i.e., an article of manufacture, according to the invention. The article of manufacture containing the computer programming code may be made and/or used by executing the code directly from one medium, by copying the code from one medium to another medium, or by transmitting the code over a network.

An apparatus for making, using, or selling the invention may be one or more processing systems including, but not limited to, a central processing unit (CPU), memory, storage devices, communication links, communication devices, servers, I/O devices, or any subcomponents or individual parts of one or more processing systems, including software, firmware, hardware or any combination or subcombination thereof, which embody the invention as set forth in the claims.

User input may be received from the keyboard, mouse, pen, voice, touch screen, or any other means by which a human can input data to a computer, including through other programs such as application programs.

One skilled in the art of computer science will easily be able to combine the software created as described with appropriate general purpose or special purpose computer hardware to create a computer system and/or computer subcomponents embodying the invention and to create a computer system and/or computer subcomponents for carrying out the method of the invention. While the preferred embodiment of the present invention has been illustrated in detail, it should be apparent that modifications and adaptations to that embodiment may occur to one skilled in the art without departing from the spirit or scope of the present invention as set forth in the following claims.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A computer program product, for use with a computer system, for directing the computer system to execute a search of information resources, the resources having content-based links between each other, to identify a desired subset of the information resources which satisfy a desired criterion, the computer program product comprising:

a computer-readable medium;

means, provided on the recording medium, for directing the computer system to identify an initial set of information resources;

means, provided on the recording medium, for directing the computer system to define initial authoritativeness information for the initial set;

means, provided on the recording medium, for directing the computer system to use the initial authoritativeness information as input authoritativeness information, to execute the steps of:

(i) producing first authoritativeness information about a set of information resources pointed to by links in resources of the input set, and (ii) producing second authoritativeness information about a set of information resources having links that point to resources of the input set; and means, provided on the recording medium, for directing the computer system to produce a final set of information resources based on the first and second authoritativeness information.

2. A computer program product as recited in claim 1, wherein the information resources include World Wide Web pages, and the content-based links include hyperlinks.

3. A computer program product as recited in claim 1, wherein the means for directing to identify an initial set of information resources includes means, provided on the recording medium, for directing the computer system to obtain, as an input, an information resource containing subject matter of interest.

4. A computer program product as recited in claim 3, wherein the means for directing to identify an initial set of information resources includes means, provided on the recording medium, for directing the computer system to identify a further set of information resources linked to the input information resource.

5. A computer program product as recited in claim 1, wherein:

the means for directing to execute the steps of producing first and second authoritativeness information is operative in a series of iterations;

the initial authoritativeness information is used as input authoritativeness information for a first iteration; and the produced first and second authoritativeness information is a result of the iteration, the first and second authoritativeness information produced in a given iteration to be used as the input authoritativeness information for the next iteration.

6. A computer program product as recited in claim 1 further comprising means, provided on the recording medium, for directing the computer system to execute the steps of producing first authoritativeness information and producing second authoritativeness information in a series of iterations until a predetermined condition is met.

7. A computer program product as recited in claim 6, wherein the predetermined condition includes the execution of a specified number of iterations.

8. A computer program product as recited in claim 6, wherein the predetermined condition includes a steady state in which further iterations result in substantially the same results.

9. A computer program product as recited in claim 6, wherein the means for directing to identify an initial set of information resources includes means, provided on the recording medium, for directing the computer system to execute a keyword-based query search, results of the search including information resources to be included in the initial set.

10. A computer program product as recited in claim 9, wherein the means for directing to identify an initial set of information resources further includes means, provided on the recording medium, for directing the computer system to identify information resources linked to or from the information resources which are the results of the search, the former information resources also to be included in the initial set.

11. A computer program product as recited in claim 10, wherein the means for directing to define initial authoritativeness information includes means, provided on the recording medium, for directing the computer system to select an initial numerical authoritativeness value for each of the information resources of the initial set.

12. A computer program product as recited in claim 11, wherein the means for directing to define initial authoritativeness information further includes means, provided on the recording medium, for directing the computer system to define an authority value and a hub value for each of the information resources of the initial set.

13. A computer program product as recited in claim 12, wherein the defined authority values and hub values are processed as vectors, each vector containing a respective term corresponding with each respective one of the information resources of the initial set, and having stored therein the value defined for that respective one of the information resources of the initial set.

14. A computer program product as recited in claim 12, wherein:

an initial hub value is defined as 1 if the information resource was found by the keyword-based query search, and 0 if the information resource is linked to or from the information resources which are the results of the search; and an initial authority value is defined as 0 for all information resources.

15. A computer program product as recited in claim 12, wherein, for each iteration:

the hub value for an information resource is updated as the sum of the authority values for authority information resources which point to the hub information resource; and the authority value for an information resource is updated as the sum of the hub values for hub information resources which are pointed to by the information resource.

16. A computer program product as recited in claim 15, wherein each iteration further includes normalizing the hub and authority values for the information resources.

17. A computer program product as recited in claim 1, wherein the means for directing to produce a final set of information resources includes means, provided on the recording medium, for directing the computer system to select information resources from the set based on their hub and authority values.

18. A computer program product as recited in claim 17, wherein the means for directing to select includes means, provided on the recording medium, for directing the computer system to select information resources whose hub values or authority values have greatest magnitudes.

19. A computer program product as recited in claim 17, wherein the means for directing to select includes means, provided on the recording medium, for directing the computer system to select a plurality of successive communities, selecting each successive community including selecting information resources whose hub values or authority values have greatest magnitudes of those information resources not already selected for a prior community.

20. A method for executing a search of information resources, the resources having content-based links between each other, to identify a desired subset of the information resources which satisfy a desired criterion, the method comprising the steps of:

identifying an initial set of information resources;

defining initial authoritativeness information for the initial set;

using the initial authoritativeness information as input authoritativeness information, executing the steps of:
(i) producing first authoritativeness information about a set of information resources pointed to by links in resources of the input set, and
(ii) producing second authoritativeness information about a set of information resources having links that point to resources of the input set; and
producing a final set of information resources based on the first and second authoritativeness information.

21. A method as recited in claim 20, wherein the information resources include World Wide Web pages, and the content-based links include hyperlinks.

22. A method as recited in claim 20, wherein the step of identifying an initial set of information resources includes obtaining, as an input, an information resource containing subject matter of interest.

23. A method as recited in claim 22, wherein the step of identifying an initial set of information resources includes identifying a further set of information resources linked to the input information resource.

24. A method as recited in claim 20, wherein:
the step of executing the steps of producing first and second authoritativeness information is executed in a series of iterations;
the initial authoritativeness information is used as input authoritativeness information for a first iteration; and
the produced first and second authoritativeness information is a result of the iteration, the first and second authoritativeness information produced in a given iteration to be used as the input authoritativeness information for the next iteration.

25. A method as recited in claim 20, wherein the steps of producing first authoritativeness information and producing second authoritativeness information are executed in a series of iterations until a predetermined condition is met.

26. A method as recited in claim 25, wherein the predetermined condition includes the execution of a specified number of iterations.

27. A method as recited in claim 25, wherein the predetermined condition includes a steady state in which further iterations result in substantially the same results.

28. A method as recited in claim 25, wherein the step of identifying an initial set of information resources includes executing a keyword-based query search, results of the search including information resources to be included in the initial set.

29. A method as recited in claim 28, wherein the step of identifying an initial set of information resources further includes identifying information resources linked to or from the information resources which are the results of the search, the former information resources also to be included in the initial set.

30. A method as recited in claim 29, wherein the step of defining initial authoritativeness information includes selecting an initial numerical authoritativeness value for each of the information resources of the initial set.

31. A method as recited in claim 30, wherein the step of defining initial authoritativeness information further includes defining an authority value and a hub value for each of the information resources of the initial set.

32. A method as recited in claim 31, wherein the defined authority values and hub values are processed as vectors, each vector containing a respective term corresponding with each respective one of the information resources of the initial set, and having stored therein the value defined for that respective one of the information resources of the initial set.

33. A method as recited in claim 31, wherein:
an initial hub value is defined as 1 if the information resource was found by the keyword-based query search, and 0 if the information resource is linked to or from the information resources which are the results of the search; and
an initial authority value is defined as 0 for all information resources.

34. A method as recited in claim 31, wherein, for each iteration:
the hub value for an information resource is updated as the sum of the authority values for authority information resources which point to the hub information resource; and
the authority value for an information resource is updated as the sum of the hub values for hub information resources which are pointed to by the information resource.

35. A method as recited in claim 34, wherein each iteration further includes normalizing the hub and authority values for the information resources.

36. A method as recited in claim 20, wherein:
each information resource is associated with an authority value and a hub value; and
the step of producing a final set of information resources includes selecting information resources from the set based on the hub and authority values.

37. A method as recited in claim 36, wherein the step of selecting includes selecting information resources whose hub values or authority values have greatest magnitudes.

38. A method as recited in claim 36, wherein the step of selecting includes selecting a plurality of successive communities, selecting each successive community including selecting information resources whose hub values or authority values have greatest magnitudes of those information resources not already selected for a prior community.

39. A system for executing a search of information resources, the resources having content-based links between each other, to identify a desired subset of the information resources which satisfy a desired criterion, the system comprising:
means for identifying an initial set of information resources;
means for defining initial authoritativeness information for the initial set;
means for using the initial authoritativeness information as input authoritativeness information, to execute the steps of:
(i) producing first authoritativeness information about a set of information resources pointed to by links in resources of the input set, and
(ii) producing second authoritativeness information about a set of information resources having links that point to resources of the input set; and
means for producing a final set of information resources based on the first and second authoritativeness information.

40. A system as recited in claim 39, wherein the information resources include World Wide Web pages, and the content-based links include hyperlinks.

41. A system as recited in claim 39, wherein the means for identifying an initial set of information resources includes means for obtaining, as an input, an information resource containing subject matter of interest.

42. A system as recited in claim 41, wherein the means for identifying an initial set of information resources includes means for identifying a further set of information resources linked to the input information resource.

43. A system as recited in claim 39, wherein:
the means for executing the steps of producing first and second authoritativeness information is operative in a series of iterations;
the initial authoritativeness information is used as input authoritativeness information for a first iteration; and
the produced first and second authoritativeness information is a result of the iteration, the first and second authoritativeness information produced in a given iteration to be used as the input authoritativeness information for the next iteration.

44. A system as recited in claim 39 further comprising means for executing the steps of producing first authoritativeness information and producing second authoritativeness information in a series of iterations until a predetermined condition is met.

45. A system as recited in claim 44, wherein the predetermined condition includes the execution of a specified number of iterations.

46. A system as recited in claim 44, wherein the predetermined condition includes a steady state in which further iterations result in substantially the same results.

47. A system as recited in claim 44, wherein the means for identifying an initial set of information resources includes means for executing a keyword-based query search, results of the search including information resources to be included in the initial set.

48. A system as recited in claim 47, wherein the means for identifying an initial set of information resources further includes means for identifying information resources linked to or from the information resources which are the results of the search, the former information resources also to be included in the initial set.

49. A system as recited in claim 48, wherein the means for defining initial authoritativeness information includes means for selecting an initial numerical authoritativeness value for each of the information resources of the initial set.

50. A system as recited in claim 49, wherein the means for defining initial authoritativeness information further includes means for defining an authority value and a hub value for each of the information resources of the initial set.

51. A system as recited in claim 50, wherein the defined authority values and hub values are processed as vectors, each vector containing a respective term corresponding with each respective one of the information resources of the initial set, and having stored therein the value defined for that respective one of the information resources of the initial set.

52. A system as recited in claim 50, wherein:
an initial hub value is defined as 1 if the information resource was found by the keyword-based query search, and 0 if the information resource is linked to or from the information resources which are the results of the search; and
an initial authority value is defined as 0 for all information resources.

53. A system as recited in claim 50, wherein, for each iteration:
the hub value for an information resource is updated as the sum of the authority values for authority information resources which point to the hub information resource; and
the authority value for an information resource is updated as the sum of the hub values for hub information resources which are pointed to by the information resource.

54. A system as recited in claim 53, wherein each iteration further includes normalizing the hub and authority values for the information resources.

55. A system as recited in claim 39, wherein the means for producing a final set of information resources includes means for selecting information resources from the set based on their hub and authority values.

56. A system as recited in claim 55, wherein the means for selecting includes means for selecting information resources whose hub values or authority values have greatest magnitudes.

57. A system as recited in claim 55, wherein the means for selecting includes means for selecting a plurality of successive communities, selecting each successive community including selecting information resources whose hub values or authority values have greatest magnitudes of those information resources not already selected for a prior community.

* * * * *